Figure 5:
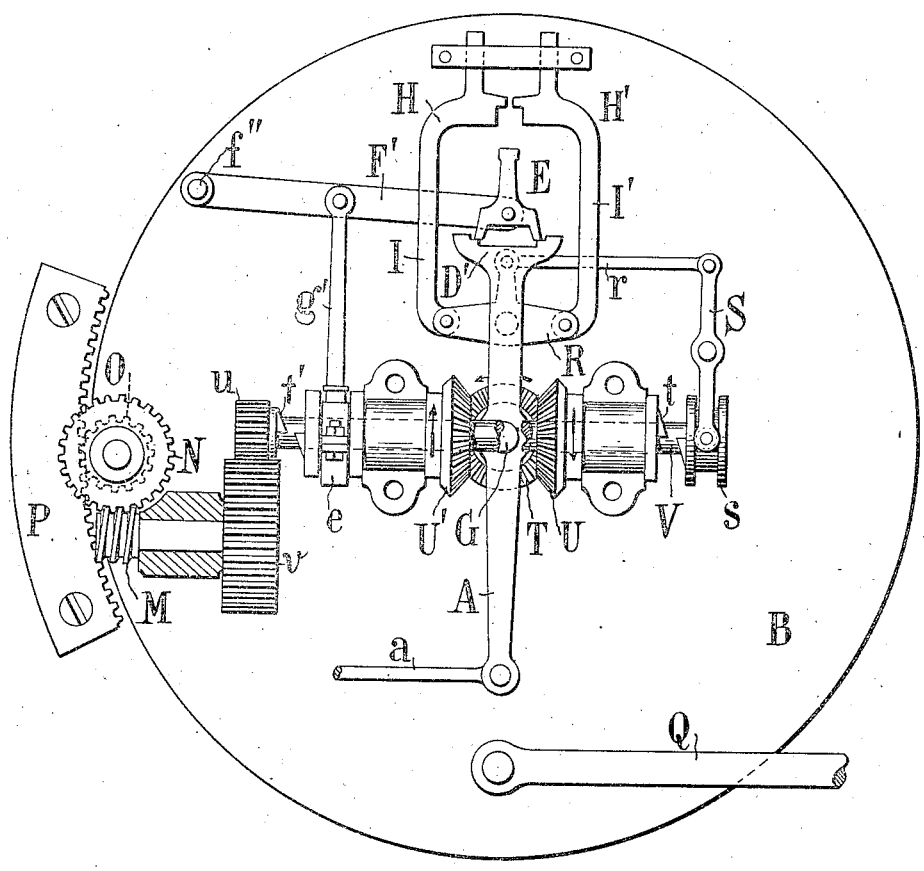

No. 880,545. PATENTED MAR. 3, 1908.
F. M. LEAVITT.
CONTROLLING MECHANISM.
APPLICATION FILED MAR. 25, 1907.
2 SHEETS—SHEET 1.
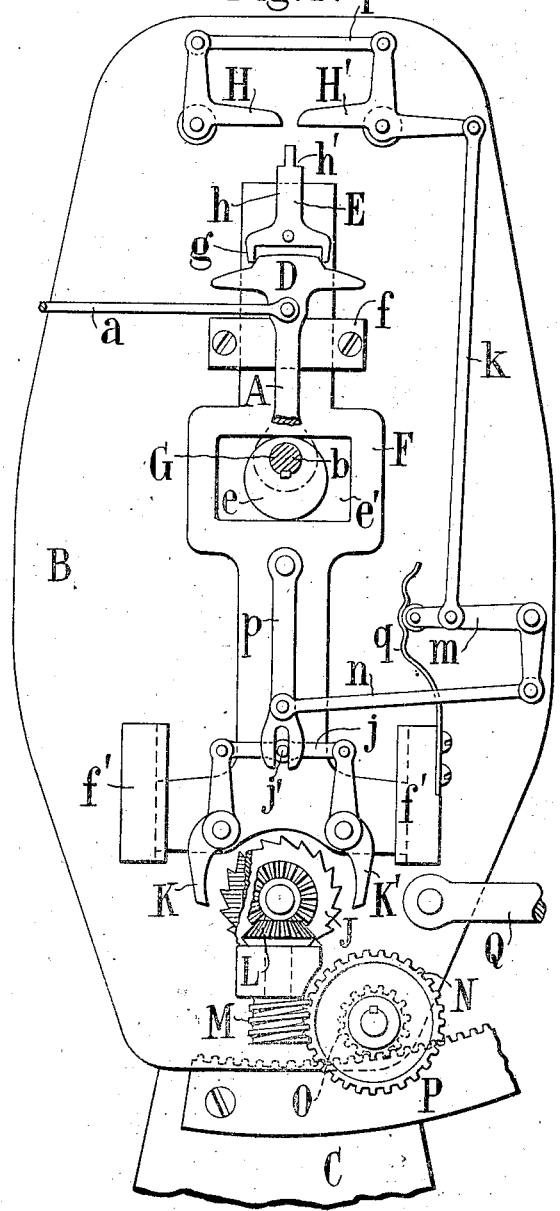
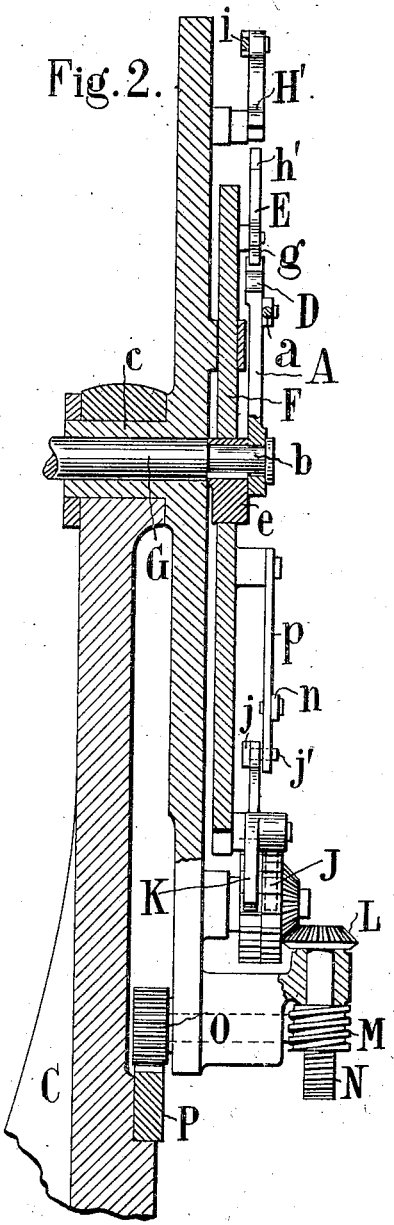
WITNESSES:
Fred White
Rene' Buine
INVENTOR:
Frank M. Leavitt,
By Attorneys, No. 880,545.  
PATENTED MAR. 3, 1908.

F. M. LEAVITT.  
CONTROLLING MECHANISM.  
APPLICATION FILED MAR. 25, 1907.

2 SHEETS—SHEET 2.

WITNESSES:  
Fred White  
René Bruine

INVENTOR:  
Frank M. Leavitt,  
By Attorneys,

UNITED STATES PATENT OFFICE.

FRANK M. LEAVITT, OF NEW YORK, N. Y., ASSIGNOR TO E. W. BLISS COMPANY, OF BROOKLYN, NEW YORK, A CORPORATION OF WEST VIRGINIA

CONTROLLING MECHANISM.

No. 880,545.	Specification of Letters Patent.	Patented March 3, 1908.

Application filed March 25, 1907. Serial No. 364,622.

*To all whom it may concern:*

Be it known that I, FRANK M. LEAVITT, a citizen of the United States, residing in the borough of Brooklyn, county of Kings, city and State of New York, have invented certain new and useful Improvements in Controlling Mechanism, of which the following is a specification.

This invention provides a mechanical movement designed for use where one part or element is by its displacement to cause or control a corresponding displacement of another part or element. Such mechanisms are chiefly applied to steering apparatus. A well-known illustration of such a controlling mechanism applied to a fluid-pressure engine is found in the hydraulic or steam steering engine used for steering ships; the pilot moves a valve (called a "floating valve") which is seated in a movable part or valve-chest which is either the piston or hydraulic plunger itself, or is connected thereto to move therewith; the displacement of the valve opens its ports and admits fluid to one side of the piston, and permits escape of fluid from the other side thereof to the exhaust; hence the piston is moved, and in moving it displaces the ports so that they follow the previous movement of the valve until they overtake it and close themselves, whereupon the flow ceases and the piston stops. The characteristic of such movements is that when the controlling part moves, the controlled part follows it until it overtakes it, and then stops. Such a mechanism is therefore colloquially known among mechanics as a "follow-up mechanism."

My invention aims to construct a follow-up mechanism in which the use of fluid under pressure shall be avoided, the movement being wholly mechanical. My device may therefore be called a "follow-up gear."

My invention also aims to so construct such a mechanism that, while the power at command for operating the controlled or driven part may be unlimited, the action may be so sensitive that the control may be derived from some very sensitive or weak element, that would be incapable of exerting any considerable force without being itself injured or deranged. Thus the control may be derived from a light pendulum, a compass needle, a gyroscope, a diaphragm subjected to a slight fluid pressure, a float, or any other sensitive part which is incapable of exerting a strong impulse or thrust.

To these ends my invention comprises a movable controlling part or pilot having a cam surface, a rapidly reciprocating part moved by suitable power, a dog or "feeler" carried by such reciprocating part and moving toward and from such cam surface, and so related thereto as to receive therefrom an impress or position according to the position of the controlling part; a tappet or tappets in position to be encountered by the dog during the receding movement of the latter so that the dog may or may not communicate movement to the tappet according to the position imparted to it by the actuating part; a carrier or traveler on which said reciprocating part and tappet are mounted; and driving means controlled by said tappet for applying power to displace the traveler and consequently the dog and tappet in the direction of displacement of the actuating part. It results from this combination of mechanism that when the controlling part is displaced in either direction its cam causes such positioning of the dog as will cause the traveler to be displaced in the same direction until it overtakes the actuating part, whereupon its cam so changes the position of the dog, and the latter so acts upon the tappet, as to stop the action of the power-driven mechanism upon the traveler and cause the latter to come to rest in a position normal to that of the controlling part. Consequently any displacement of the controlling part in either direction results in a subsequent and equal or corresponding displacement of the traveler in the same direction.

My present invention may among other uses be applied to gyroscopically-controlled apparatus, in which case it constitutes an improvement upon or development of the device set forth in my United States Patent No. 795,045 granted July 18, 1905.

Figure 3:
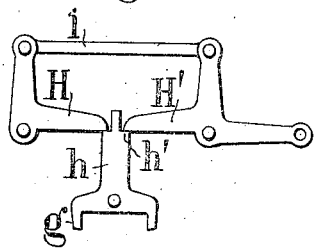
Figure 4:
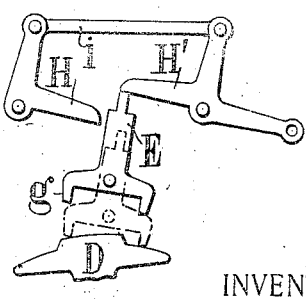

Figure 1 of the accompanying drawings is a front elevation of one embodiment of the present invention; Fig. 2 is a vertical midsection thereof; Figs. 3 and 4 are fragmentary views showing the dog and tappets in different positions; Fig. 5 is a front elevation of a modified construction.

Referring first to Figs. 1 and 2, let A designate the controlling or actuating part, or pilot, mounted in any suitable way so as to be movable, and moved by any suitable means, such as by a rod or link $a$ connecting it with any part which is to control the motion, such as a compass, gyroscope, float, pilot-wheel, or other source of control or direction. The part A is shown as a lever fulcrumed on a center $b$.

B is the controlled part or traveler which is to execute movements following those of the pilot part A. It is shown as an oscillatory part having a hub $c$ turning in a bearing in a supporting frame C, which latter may be of any suitable shape. A suitable light dog or feeler E is carried by a reciprocating part F, which in turn is carried by the traveler B. The part F is shown as a slide moving in suitable guides $f f'$. It is rapidly reciprocated by any suitable source of power. The means for communicating this power is shown as a shaft G revolving concentrically within the hub $c$, and having fixed upon it an eccentric $e$ which engages the slide F by means of a transverse slot $e'$ in the latter, in which the eccentric turns and by which it communicates longitudinal reciprocating movements to the slide.

The feeler E is shown as a forked piece pivoted freely to the slide F, having feet or toes $g$ projecting toward the pilot A and having an arm $h$ projecting upwardly and adapted to engage one or other or both of two movable parts or tappets H H'. The part of the pilot A which coöperates with the feeler or dog E is formed as a cam D, so shaped as to engage the toes $g$. When the pilot is in the central position, as shown, its cam is engaged by both toes as the dog comes into touch with it, the result of which is that the dog is placed in the intermediate position shown. The reciprocating motion is sufficiently rapid so that the dog in its receding movement necessarily retains the position thus imparted to it, and in so doing its end enters between the tappets H H', and shoulders $h'$ on the dog engage these tappets as shown in Fig. 3. If, however, the pilot is moved to either side, its cam D acts to tilt the dog, as shown in dotted lines in Fig. 4, and the dog in receding from the cam strikes one or other of the tappets and forces it upwardly as shown in full lines in Fig. 4, the other tappet moving correspondingly downward. To insure this relative movement of the tappets, any suitable connection is made between them, as for example by means of a link $i$. Upon the cam again reaching a central position relatively to the dog, the latter is brought back to the intermediate position, and its shoulder $h'$ strikes under the lowered tappet and restores the tappets to their intermediate position as shown in Figs. 1 and 3.

My invention requires that upon each displacement of the pilot the dog E and the tappets shall be carried bodily in the same direction, so that they will eventually overtake the pilot and restore the normal relative positions of these respective parts. To this end the tappets and the slide or other form of carrier F for the dog are carried on the traveler B, and a power-driven mechanism is provided for displacing this traveler under the control of the tappets, so that when the tappets are moved from their normal position as shown in Fig. 1, they set in operation the means for thus displacing the traveler B. One means of accomplishing this movement is shown in Figs. 1 and 2, where a ratchet-and-pawl device is utilized for imparting the requisite motion in forward or backward direction. To this end ratchet wheels J and pawls K K' are provided, the ratchet wheels having their teeth oppositely directed, and being connected by miter gears L and a worm M to a worm-wheel N fixed on a shaft which also carries a pinion O meshing with a fixed rack or sector P, so that whenever the ratchet wheels are turned by the pawls, motion is imparted to this train of gearing, with the result that the pinion O travels along the sector P, carrying with it the traveler B. These movements are accomplished by the pawls K K' which are reciprocated from any suitable source of power, as for example by being mounted on the same reciprocating slide F. In the normal position of the parts the pawls are out of engagement with the ratchet wheels as shown. The pawls have tails connected by a link $j$, so that as either pawl is turned toward its ratchet wheel the other pawl recedes and is kept out of action. The pawls are connected in any suitable way to the tappets H H'. The connection shown consists of a link $k$, elbow-lever $m$, and link $n$ connecting to an arm $p$ pivoted to the slide F, and having a slotted or forked engagement with a pin $j'$ on the link $j$. To hold the parts in either of the three positions against accidental displacement and until the position is forcibly changed by impact of the dog E, a spring $q$ coöperating with an arm of the elbow-lever $m$ is provided. So long as the parts occupy the central position shown, the pawls K K' are held out of engagement with the ratchet wheels. Upon an action of the dog upon either tappet, as shown for example in Fig. 4, a tilting movement is communicated to the arm $p$ whereby the pawls are tilted, carrying one of them into position to engage its ratchet wheel, and moving the other further from its wheel. This occurs at the end of the up-stroke of the slide F, and by reason of the spring $q$ the parts retain these positions, and during the down-stroke the pawl which has been thrust toward its wheel engages one of the teeth thereof and moves it the space of one tooth. So long as the pawl is held thus displaced, it acts at each stroke of the slide to turn its ratchet wheel one tooth forward. Any necessary deflection of the pawl in clearing the ratchet teeth is provided for by a slight yielding of the spring $q$. The pawls K K' being arranged to act upon opposite sides of the ratchet wheels, are adapted to turn them in contrary directions. Hence so long as one pawl is in engagement, the train of gearing is intermittently moved in one direction, and the traveler B is given a rotary movement such as to cause the dog E to follow the displacement originally imparted to the pilot A. As soon as the traveler overtakes the pilot, the dog is restored to its central position, thereby restoring the tappets to their normal positions and moving the pawls to their middle or negative positions, as shown in Fig. 1.

Movement can be imparted from the traveler B to any desired mechanism in any suitable way, as for example by means of a link or connecting rod Q. Another construction is shown in Fig. 5. Here the pilot A is shown as a lever tilted by a rod $a$ and having a cam D', which in this instance is shown as a stepped cam engaging a somewhat modified form of dog E. The latter is pivoted to a reciprocating part, which in this construction consists of a lever F' fulcrumed at $f''$ and reciprocated by being connected by a rod $g'$ to an eccentric $e$. The tappets H and H' are of different form, but coact with the dog E to the same effect as those already described. The tappets are here shown as formed on links I I' connecting with two opposite arms of a lever R having an intermediate arm which connects by a link $r$ with the clutch-operating lever S. Power is applied by a central shaft G passing as before through the hub of the carrier B, and having fixed on it a miter gear T meshing with oppositely revolving miter gears U U' formed on hollow shafts or journals through which passes a central driven shaft V. The gears U U' are constantly revolving, and one of them carries the eccentric $e'$. The shaft V carries a clutch collar $s$ by which to move it endwise. In its intermediate position as shown, it is disconnected and remains stationary. If displaced in one direction, clutch teeth $t$ are engaged, whereby it is driven from the gear U; if displaced in the contrary direction, clutch teeth $t'$ are engaged whereby it is rotated in the opposite direction by the gear U'. The shaft V carries a pinion $u$ meshing with a gear $v$, on the shaft of which is a worm M driving a worm-wheel N, on the shaft of which is a pinion O meshing with the toothed sector P exactly as in the first described construction. The operation of this modification is essentially the same as that first described, except that instead of the power for turning the traveler B being applied intermittently by a rachet and pawl movement, it is applied continuously through the action of a right-and-left clutch.

Obviously the apparatus may be modified in various other ways within the principle of my invention.

It is an important advantage of my invention that the control of the transmission and power from the pilot A is effected without any perceptible reaction or back thrust such as would tend to resist the movement of the pilot. This is due to the fact that the light dog or feeler E merely touches the cam surface, its impact therewith being so light as to produce no perceptible effect tending to displace the pilot in forward or backward direction. Nevertheless the dog serves as a means for transmitting any desired amount of power during its retreating movement, and after it has passed entirely out of contact with the pilot, so that the tappets are actuated with any requisite force for controlling the application of power for causing the traveler B to travel forward or backward in its following movement, in order that it may follow up and overtake the movement of the pilot. This mechanism is capable of a great variety of applications in the mechanic arts, being especially desirable where a light, sensitive, or delicate part is required to control the application of suitable power to turn a heavy or powerfully controlled actuated part.

I claim as my invention:—

1. A follow-up gear comprising a movable controlling or pilot part, a movable controlled part, power-driven means for displacing the latter, and a continuously reciprocating dog governed by said pilot part and adapted to control said power-driven means, whereby a displacement of the pilot part is followed by a corresponding displacement of the controlled part.

2. A follow-up gear comprising a movable controlling or pilot part, a reciprocating dog moving toward and from it, power-driven propelling means controlled by said dog, and a controlled part or traveler adapted to be driven by said propelling means in either direction according to the position impressed by the pilot part upon said dog.

3. A follow-up gear comprising a movable controlling or pilot part, a controlled part or traveler, a reciprocating dog carried thereby, moving toward and from said pilot part, and a power-driven propelling mechanism controlled by said dog for propelling said traveler in either direction.

4. A follow-up gear comprising a movable controlling or pilot part, a reciprocating dog moving toward and from said pilot part, so as to be positioned thereby corresponding to the position of the pilot part, a tappet adapted to be encountered by said dog as the latter recedes from said pilot part, a traveler carrying said reciprocating dog and tappet, and power-driven mechanism controlled by said tappet for propelling the traveler in either direction, whereby the traveler carries the tappet and dog in the direction of displacement of the pilot part until they overtake the latter.

5. A follow-up gear comprising a movable controlling or pilot part, a controlled part or traveler, a reciprocating part carried thereby, a dog carried by said reciprocating part, a tappet carried by said traveler, and acted on by said dog, a source of power, mechanism driven thereby for propelling the traveler in either direction under control of said tappet, whereby the traveler carries the tappet and dog in the direction of displacement of the pilot part until they overtake the latter.

6. A follow-up gear comprising a movable controlling or pilot part, a controlled part or traveler, a reciprocating part carried thereby, a dog carried by said reciprocating part, moving toward and from said pilot part so as to be positioned thereby, a tappet carried by said traveler and adapted to be encountered by said dog as the latter recedes from said pilot part, said dog and tappet having the one a single and the other double shoulders adapted in the mid-position of the dog to bring the tappet to mid-position and in the displaced positions of the dog to displace the tappet, and a power-driven propelling mechanism controlled by the positions of said tappet for propelling the traveler in either direction.

7. A follow-up gear comprising a movable controlling or pilot part, a controlled part or traveler, a reciprocating part carried thereby, a dog carried by said reciprocating part, moving toward and from said pilot part so as to be positioned thereby, oppositely acting tappets carried by said traveler and adapted to be encountered by said dog as the latter recedes from said pilot part, said dog and tappets having the one a single and the other double shoulders adapted in the mid-position of the dog to bring the tappets to mid-position and in the displaced positions of the dog to displace the tappets, and a power-driven propelling mechanism controlled by the positions of said tappets for propelling the traveler in either direction.

8. A follow-up gear comprising a movable controlling or pilot part, a controlled part or traveler, a reciprocating dog carried thereby, moving toward and from said pilot part, and a power-driven ratchet and pawl propelling mechanism for propelling said traveler in either direction comprising oppositely acting pawls and means for throwing them into active or inactive position under control of said dog.

9. A follow-up gear comprising a movable controlling or pilot part, a controlled part or traveler, a reciprocating dog carried thereby, moving toward and from said pilot part so as to be positioned thereby, a power-driven ratchet and pawl propelling mechanism comprising a reciprocating part, oppositely acting pawls carried thereby, and means controlled by said dog adapted to hold both pawls out of action or to throw either pawl into action.

10. A follow-up gear comprising a movable controlling or pilot part, a controlled part or traveler, a power-driven reciprocating slide carried thereby, a dog carried by said slide and reciprocated thereby toward and from said pilot part so as to be positioned thereby, tappets carried by said traveler and adapted to be acted on by said dog, pawls carried by said slide and controlled by said tappets, and ratchet wheels adapted to be turned in either direction by said pawls and thereby to propel the traveler in a direction following the displacement of the pilot part.

In witness whereof, I have hereunto signed my name in the presence of two subscribing witnesses.

FRANK M. LEAVITT

Witnesses:
  H. F. HUGHES,
  ARTHUR C. FRASER.